(12) United States Patent
Murase

(10) Patent No.: US 8,570,605 B2
(45) Date of Patent: Oct. 29, 2013

(54) IMAGE CORRECTION METHOD AND IMAGE CORRECTION SYSTEM

(75) Inventor: Takeshi Murase, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 267 days.

(21) Appl. No.: 12/697,792

(22) Filed: Feb. 1, 2010

(65) Prior Publication Data

US 2010/0208304 A1 Aug. 19, 2010

(30) Foreign Application Priority Data

Feb. 13, 2009 (JP) ................................. 2009-031967

(51) Int. Cl.
*G06T 5/00* (2006.01)

(52) U.S. Cl.
USPC ............. 358/3.26; 358/1.2; 358/2.1; 358/1.9; 702/55

(58) Field of Classification Search
USPC ........................ 358/3.26, 2.1, 1.9, 1.2; 702/55
See application file for complete search history.

(56) References Cited

U.S. PATENT DOCUMENTS

| 5,712,666 | A | 1/1998 | Matsubara et al. | |
|---|---|---|---|---|
| 6,788,434 | B1 * | 9/2004 | Kanematsu et al. | 358/1.9 |
| 6,795,213 | B1 | 9/2004 | Hanyu | |
| 6,853,464 | B1 | 2/2005 | Ueda et al. | |
| 6,945,626 | B2 | 9/2005 | Tsuchiya et al. | |
| 7,948,666 | B2 | 5/2011 | Yoshida et al. | |
| 2001/0015815 | A1 | 8/2001 | Hada et al. | |
| 2005/0185011 | A1 | 8/2005 | Kakutani | 347/19 |
| 2006/0028665 | A1 | 2/2006 | Kawai | 358/1.9 |
| 2006/0126139 | A1 | 6/2006 | Tanaka | |
| 2006/0276978 | A1 * | 12/2006 | Yamamoto et al. | 702/55 |
| 2007/0019258 | A1 | 1/2007 | Hattori | 358/518 |
| 2007/0030525 | A1 | 2/2007 | Ono | 358/406 |
| 2008/0018962 | A1 | 1/2008 | Kawai | 358/522 |
| 2009/0002390 | A1 | 1/2009 | Kuno | 345/593 |
| 2009/0003696 | A1 | 1/2009 | Ishii et al. | 382/167 |
| 2010/0110460 | A1 | 5/2010 | Miyata | 358/1.9 |
| 2010/0207972 | A1 | 8/2010 | Kawai | 347/6 |

FOREIGN PATENT DOCUMENTS

| JP | 10-278360 A | 10/1998 |
|---|---|---|
| JP | 2000-209450 | 7/2000 |
| JP | 2000-301773 | 10/2000 |
| JP | 3867437 | 1/2007 |
| JP | 2008-244926 A | 10/2008 |

* cited by examiner

*Primary Examiner* — Twyler Haskins
*Assistant Examiner* — Michael Burleson
(74) *Attorney, Agent, or Firm* — Fitzpatrick, Cella, Harper & Scinto

(57) ABSTRACT

A patch is printed on a printing medium, and ink discharge amount information is acquired from a colorimetric value that is acquired by measuring a printed patch. According to the information, color correction is performed on image data to be processed for printing, using a correction table that corresponds to a designated type of printing media.

22 Claims, 7 Drawing Sheets

| HEAD DISCHARGE AMOUNT RANK | L* FOR GLOSSY PAPER | L* FOR ART PAPER |
|---|---|---|
| −4 | 43〜45 | 55〜56 |
| −3 | 41〜43 | 54〜55 |
| −2 | 39〜41 | 53〜54 |
| −1 | 37〜39 | 52〜53 |
| 0 | 35〜37 | 51〜52 |
| +1 | 33〜35 | 50〜51 |
| +2 | 31〜33 | 49〜50 |
| +3 | 29〜31 | 48〜49 |

| HEAD DISCHARGE AMOUNT RANK | DIFFERENCE IN L* BETWEEN PATCHES 1 AND 2 ON GLOSSY PAPER | DIFFERENCE IN L* BETWEEN PATCHES 1 AND 2 ON ART PAPER |
|---|---|---|
| −4 | 10~11 | 7~8 |
| −3 | 11~12 | 8~9 |
| −2 | 12~13 | 9~10 |
| −1 | 13~14 | 10~11 |
| 0 | 14~15 | 11~12 |
| +1 | 15~16 | 12~13 |
| +2 | 16~17 | 13~14 |
| +3 | 17~18 | 14~15 |

IMAGE CORRECTION METHOD AND IMAGE CORRECTION SYSTEM

BACKGROUND OF THE INVENTION

1. Field of the Invention

The present invention relates to an image correction method and an image correction system for performing image correction.

2. Description of the Related Art

Color printers such as inkjet printers print color images in three color inks including cyan (C), magenta (M), and yellow (Y) inks or in four color inks including a black (K) ink in addition to the above three. Some printers are capable of changing the paper type (e.g., ordinary printing paper or surface-coated glossy paper (coated paper)), and the variety of paper types has increased along with the demands for improved image quality in recent years. When using an image forming apparatus of such a type, a user selects paper as appropriate from the above mentioned types to produce a desired image.

Incidentally, color images can be printed in their originally intended colors only when print heads discharged color inks in planned amounts, and if the amounts of color inks discharged vary, color reproducibility is lowered. Conceivable factors responsible for such variations in the amounts of color inks discharged include manufacturing tolerances of discharge units that discharge inks, and so on.

As a technique for correcting color reproducibility relating to these factors, a technique is disclosed that sets conversion characteristics for image forming conditions by performing printing on an image forming apparatus, obtaining color reproducibility as colorimetric data with a colorimeter, and comparing the colorimetric data with reference data (Japanese Patent No. 3867437). Also, another color correction technique is disclosed that performs gradation processing before color correction processing, because in the inkjet system, the number of dots deposited on paper does not show a linear change with the actual density (Japanese Patent Laid-Open No. 2000-301773). Also, Japanese Patent Laid-Open No. 2000-209450 discloses a method for creating a color correction table that is used to correct color conversion characteristics for certain image forming conditions into desired standard-color characteristics. Japanese Patent Laid-Open No. 2000-209450 discloses the technique for creating a color correction table by performing computations that can absorb a difference between different image forming conditions when the image forming conditions vary (Japanese Patent Laid-Open No. 2000-209450).

The general view of inkjet image forming apparatuses is that colors are determined by the printing paper type, the ink types, and the amounts of inks deposited per dot discharged from heads. Under such circumstances, the variety of the paper type has increased together with the recent improvement in image quality, and various paper types such as glossy paper and art paper are printable. However, because color-development characteristics vary from paper to paper, color-correction parameters that have been determined for a certain paper type are difficult to be used for other paper types for the purpose of achieving simple and high-precision color correction.

In Japanese Patent No. 3867437, since color reproducibility varies depending on image forming conditions, color reproducibility in an image forming apparatus is corrected under each image forming condition. With such a color correction technique, however, it is difficult to perform color correction under any image forming conditions other than those for which color reproducibility has already been corrected. As a result, a user of an image forming apparatus needs to perform printing and colorimetry under every available image forming conditions, which results in an increase in user workload and a lack of convenience. For example, the user's time and effort and cost increase with increased user workload and increased output paper waste.

Also, Japanese Patent Laid-Open No. 2000-301773 discloses a technique for performing color correction after every gradation processing performed by an image forming apparatus. With such a color correction technique, however, color correction needs to be performed for every execution of gradation processing as in Japanese Patent No. 3867437, which results in a lack of convenience as in the case of Japanese Patent No. 3867437.

In Japanese Patent Laid-Open No. 2000-209450, a dot-like printing material having multiple gradations for each element color is deposited on a printing medium and compared with standard colorimetric data so as to compute a color correction table. Moreover, if image forming conditions vary, parameters that can absorb a color difference between different image forming conditions are used to compute a color correction table. Such a technique, however, does not focus on the ink deposition amount discharged from a head. In inkjet printers, because the ink discharge (deposition) amount on paper does not show a linear change with a color change, it is necessary to acquire a colorimetric value for each gradation if gradations are different. In order to achieve high-precision color correction, it is thus necessary to print images with different ink deposition amounts on paper and perform colorimetry on those images. Unfortunately, this results in a lack of user convenience. In addition, it is also necessary to compute a color correction table, which increases the processing load required for computation.

With the above in view, a technique is required for performing color correction arising from individual differences among image forming apparatuses without sacrificing user convenience, in the case where image forming conditions such as the paper type vary in an image forming apparatus.

SUMMARY OF THE INVENTION

An aspect of the present invention is to eliminate the above-mentioned problems with the conventional technology.

The present invention provides an image correction system and an image correction method that perform color correction arising from individual differences among image forming apparatuses without sacrificing user convenience.

The present invention in its first aspect provides an image correction system that performs correction on image data to be processed for printing by measuring a patch printed by an inkjet printer that is capable of printing on a plurality of types of printing media by discharging an ink, the system comprising: a first acquiring unit configured to acquire a colorimetric value by measuring a patch printed on a printing medium by the inkjet printer; a storage unit configured to store a plurality of tables, each showing a correspondence between the colorimetric value and ink discharge amount information, for the plurality of types of printing media; a designation unit configured to designate a type of printing media for use in processing the image data for printing; a second acquiring unit configured to acquire ink discharge amount information based on the colorimetric value, using a table that corresponds to the type of printing media designated by the designation unit from among the plurality of tables; and a correction unit configured to correct the image data to be processed for printing, according to the ink discharge amount information acquired by the second acquiring unit.

The present invention in its second aspect provides an image correction method for performing correction on image data to be processed for printing by measuring a patch printed by an inkjet printer that is capable of printing on a plurality of types of printing media by discharging an ink, the method comprising: a first acquiring step of acquiring a colorimetric value by measuring a patch printed on a printing medium by the inkjet printer; a designation step of designating a type of printing media for use in processing the image data for printing; a second acquiring step of acquiring ink discharge amount information based on the colorimetric value, using a table that corresponds to the type of printing media designated in the designation step from among a plurality of tables that each show a correspondence between the colorimetric value and the ink discharge amount information, for the plurality of types of printing media; and a correction step of correcting the image data to be processed for printing, according to the ink discharge amount information acquired in the second acquiring step.

According to the present invention, it is possible to perform color correction arising from individual differences among image forming apparatuses or aged deterioration, without sacrificing user convenience.

Further features of the present invention will become apparent from the following description of exemplary embodiments with reference to the attached drawings.

DESCRIPTION OF THE EMBODIMENTS

Figure 1:
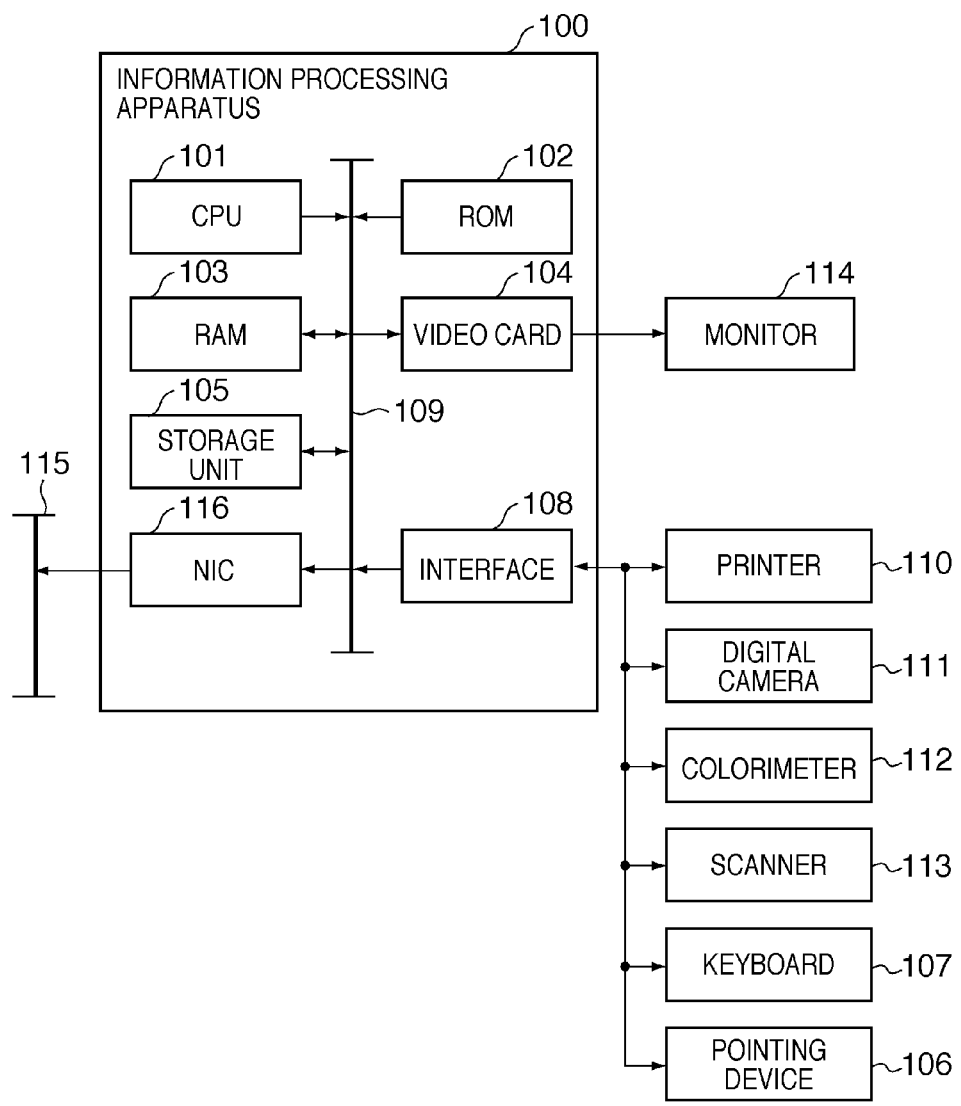
FIG. 1 is a diagram illustrating an example of a configuration of an image correction system.

Preferred embodiments of the present invention will now be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Note that the same components are denoted by the same reference numerals and not described herein. First, configuration blocks that are necessities for embodiments of the present invention are described, and then processing will be described in detail.

Embodiments according to the present invention provide an image correction system that performs color correction arising from individual differences among image forming apparatuses such as printers or resulting from aged deterioration, without sacrificing user convenience. In the image correction system according to the present invention, if color correction processing is performed under certain image forming conditions, high-precision color correction processing can also be performed under different image forming conditions.

First Embodiment

FIG. 1 is a diagram illustrating an example of a configuration of an image correction system. An information processing apparatus 100 includes a CPU 101, a ROM 102, a RAM 103, and a video card 104 that provides connection to a monitor 114 (which may include a touch panel). It further includes a storage unit 105 serving as a storage area, such as an HDD (hard disk drive) or a memory card. The apparatus also includes an interface 108 for a serial bus such as USB or IEEE 1394 to provide connection to a pointing device 106 such as a mouse, a stylus, or a tablet and to a keyboard 107. The apparatus further includes a network interface card (NIC) 116 that provides connection to a network 115. These components are connected to one another via a system bus 109. The interface 108 can establish connection with a printer 110 such as an inkjet printer that serves as an image forming apparatus, a digital camera 111, a colorimeter 112, a scanner 113, and so on.

The CPU 101 loads a program (which includes an image processing program described below) stored in either the ROM 102 or the storage unit 105 into the RAM 103 that serves as a work memory, so as to execute the program. According to the program, the above mentioned components are controlled via the system bus 109 so as to implement the function of the program.

Note that FIG. 1 illustrates a general hardware configuration of the information processing apparatus described in the present embodiment, and even a configuration without some of the components or with any additional devices is also included within the scope of the present invention. The present embodiment describes a configuration that performs printing, colorimetry, and correction with each single gradation for each ink for a certain paper type.

Figure 2:
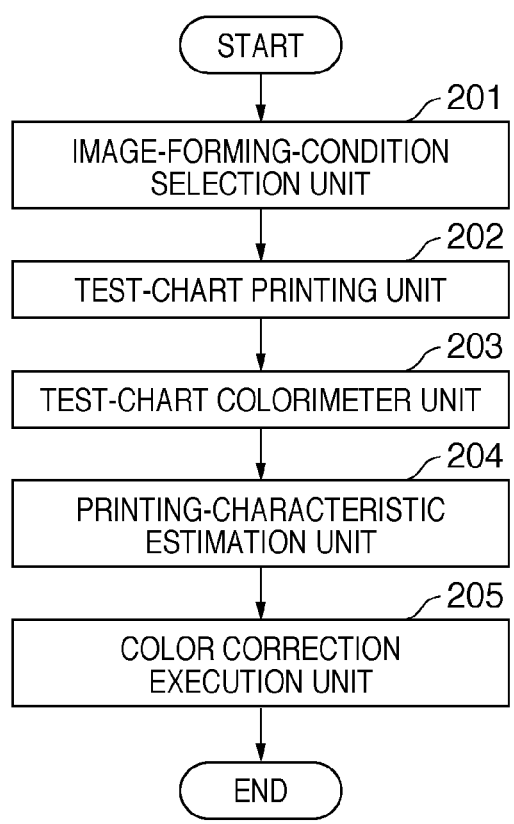
FIG. 2 is a diagram illustrating configuration blocks that perform color correction processing.

FIG. 2 is a diagram illustrating a block configuration of an information processing apparatus that performs color correction processing. Specifically, in the information processing apparatus according to the present embodiment, an image-forming-condition selection unit 201 selects the paper type for use in printing a test chart. Then, a test-chart print unit 202 prints a chart based on the selected paper type. Then, a test-chart colorimetry unit 203 performs colorimetry on the printed chart. Then, a printing-characteristic estimation unit 204 estimates printing characteristics of an image forming apparatus based on a colorimetric value obtained by the test-chart colorimetry unit 203. Finally, a color-correction execution unit 205 performs correction based on the printing characteristics of the image forming apparatus that have been obtained by the printing-characteristic estimation unit 204.

By using the configuration illustrated in FIG. 2, simple and high-precision color correction is performed. Now, the details of the components will be described. The image-forming-condition selection unit 201 selects image forming conditions for a test chart. In other words, test-chart printing conditions (image forming conditions) are selected via the image-forming-condition selection unit 201. The printing conditions as referred to herein include an apparatus that prints a test chart, paper type, ink type, and so on. If the image forming apparatus has the function of determining the paper type, the image forming apparatus may select the paper type automatically without the user having to make selection. That is, the image forming apparatus is capable of acquiring test-chart printing conditions (image forming conditions) via the image-forming-condition selection unit 201.

Then, the test-chart print unit 202 prints a test chart under the image forming conditions that have been acquired by the image-forming-condition selection unit 201. Here, a predetermined test chart is printed under the selected printing conditions. Note that the test chart includes an area that is printed in single color ink because color correction needs to be performed for each ink type. Then, the test-chart colorimetry unit 203 performs colorimetry on the printed test chart. Then, the printing-characteristic estimation unit 204 of the information processing apparatus estimates printing characteristics based on the colorimetric value acquired by the test-chart colorimetry unit 203.

In the present embodiment, the estimation of printing characteristics is performed, focusing on a discharge amount that is a characteristic independent of image forming conditions (e.g., paper type). The use of such a characteristic, namely the discharge amount, that is independent of image forming conditions allows the same printing characteristics to be acquired even if the estimation of printing characteristics is performed under any image forming conditions. It is thus unnecessary to estimate printing characteristics under each of multiple image forming conditions. Moreover, if a correction technique corresponding to the printing characteristics acquired under each image forming conditions is prepared in advance, color correction can be performed based on the printing characteristics.

Now, the estimation of printing characteristics will be described in detail. For the estimation of printing characteristics, information that shows the correspondence between the printing characteristics of an image forming apparatus and colorimetric values is created in advance for each paper type. According to the created information, printing characteristics corresponding to the acquired colorimetric value are estimated. The printing characteristics as referred to herein include the amount of ink (discharge amount) per dot from a print head that deposits ink on a printing medium. The reason why the amount of ink per dot discharged from a print head can be estimated from a colorimetric value is described below.

Generally, three factors, namely paper type, ink type, and the amount of ink on paper, are considered as the factors that affect the color of printed matter in an inkjet printer. From among them, the paper type is uniquely designated by the image-forming-condition selection unit 201, and the ink type is also uniquely designated because it is peculiar to a device. The amount of ink on paper is obtained by multiplying the number of dots discharged from a print head by the amount of ink per dot. Here, the amount of ink on paper represents the amount of ink per dot itself because the number of dots is set to the same condition with the use of a test chart.

It is also a well-known fact that the sizes of dots discharged on paper and the amount of ink per dot have correlation to each other, and there is also correlation in the correspondence between the sizes of dots and the colorimetric value. From among them, the present embodiment focuses on the amount of ink per dot and the colorimetric value to perform color correction. Thus, if the correspondence between the amount of ink per dot and the colorimetric value is created and held in advance, the amount of ink per dot can be calculated from the colorimetric value. That is, in the present embodiment, if the same paper type and the same ink type are used, the amount of ink per dot can be estimated from the colorimetric value.

It is, however, also a well-known fact that the correspondence between the amount of ink per dot and the sizes of dots discharged on paper varies if the paper type is different. One considerable factor in this is that paper has different spreading characteristics when it absorbs dots discharged thereon. Thus, even through the same amount of ink dots are discharged, the sizes of dots on paper vary if the paper type is different; as a result, the correspondence between the amount of ink per dot and the colorimetric value varies depending on the paper type. However, if the same head is used, the amount of ink per dot discharged from the head remains unchanged even if the paper type is different. Accordingly, in the present embodiment, the correspondence between the amount of ink per dot and the colorimetric value is held for each paper type so that the amount of ink per dot discharged from a head can be estimated in a simple manner. That is, the amount of ink per dot, which is information independent of the paper type, is calculated based on the colorimetric value.

Then, the color-correction execution unit 205 performs color correction processing based on the printing characteristics of the image forming apparatus that have been estimated by the printing-characteristic estimation unit 204. Here, multiple color correction conditions for performing color correction in an image forming apparatus are prepared in advance for each printing characteristics of the image forming apparatus, a color correction condition is selected from among those conditions based on the estimated printing characteristic, and color correction is performed in the image forming apparatus under the selected color correction conditions.

As described, the discharge amount that is an inherent characteristic to an image forming apparatus irrespective of the image forming conditions is focused on as the information necessary for performing color correction, and that information is managed by the information processing apparatus. As a result, a desired image can be obtained even if image forming conditions at the time of determining color correction conditions are different from the image forming conditions at the time of performing correction under the color correction conditions.

The first embodiment describes an example where color correction conditions are determined by printing a chart with a single gradation at the time of estimating the discharge amount. A second embodiment describes an example where color correction conditions are determined by printing a chart with multiple gradations at the time of estimating the discharge amount. A third embodiment describes an example where error determination processing is performed at the time of estimating the discharge amount.

The present embodiment describes color correction in a printer that performs printing using the four color inks C (cyan ink), M (magenta ink), Y (yellow ink), and K (black ink). In general, inks that are used in an image forming apparatus that forms dots on a printing medium so as to print an image generally include the four color inks C, M, Y and K, and the present embodiment also describes such a configuration. With the recent demands for improved image quality, printers that are equipped with a large number of inks, such as a light cyan ink, a light magenta ink, a red ink, and a green ink, are increasingly popular. It is, however, apparent that the embodiments according to the present invention are not affected by the ink types because they focus on the amount of ink per dot discharged from a head for each ink.

It is thus obvious that the effect of the present embodiment can also be achieved with printers that include different numbers of inks including any inks other than the CMYK inks; and with printers that include different combinations of ink types other than the CMYK inks. Note that, in order to avoid duplication of the description, the following description gives an example where a printing characteristic of a certain single-color ink type is estimated to perform correction. In the actual configuration, however, desired color correction can be implemented by estimating a printing characteristic for each ink type for correction. Also, as to available paper types, two paper types, namely glossy paper and art paper, are described in order to simplify the description. It is, however, apparent that the effect of the present embodiment can also be achieved with different paper types or with a greater number of paper types. A recent trend in printers is an increasing number of available paper types, which apparently enhances the effect of convenience of the present embodiment. In the following description, the amount of ink per dot discharged from a head is referred to as a "head ink discharge amount". Moreover, the information processing apparatus according to the present invention converts a value obtained by conversion of the head ink discharge amount into discrete rank information and manages it as head discharge amount rank information.

Figure 3:
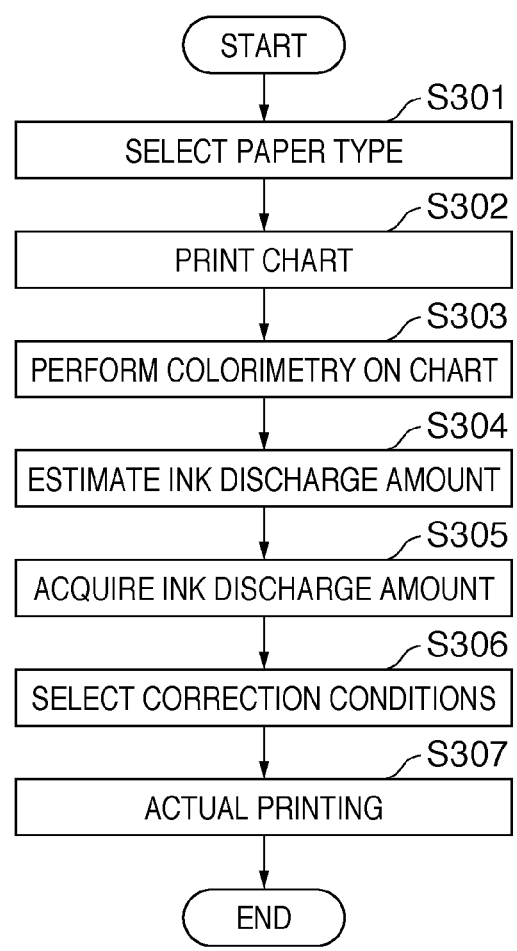
FIG. 3 is a flow chart showing a procedure for color correction processing according to the first embodiment.

FIG. 3 is a flow chart showing a procedure for color correction processing according to the first embodiment. In the present embodiment, chart printing and colorimetry are performed with an image forming apparatus, printing characteristics of the image forming apparatus are estimated to select color correction conditions, and correction is performed under the selected conditions. Now, the overall procedure will be described, and each processing will be described in detail. Note that, in the present embodiment, color correction processing is roughly divided into two types of processes. One is the process for determining color correction conditions for performing color correction, and is performed by a user at any arbitrary time. This process is described with reference to the processing of steps S301 to S305 shown in FIG. 3. The other is the process for performing color correction under the color correction conditions determined through the above mentioned process, and is performed every time a user runs the apparatus. This process is described with reference to the processing of steps S306 to S307 shown in FIG. 3. Note that, in order to simplify the description, the present embodiment describes a case where the above mentioned two processes are performed consecutively. However, another configuration is also conceivable in which color correction is performed by performing the latter process by referring to information that has been obtained through the above mentioned former process performed in the past in user environments. It is, however, apparent that the effect of the present embodiment can also be achieved irrespective of what type of configuration is used to perform the abovementioned two processes.

In step S301, the paper type for use in printing a test chart is selected. Then, a chart is printed based on the selected paper type in step S302. Then, colorimetry is performed on the printed chart in step S303. Then, in step S304, an ink discharge amount is estimated based on a colorimetric value obtained in step S303. Then, the ink discharge amount estimated in step S304 is acquired in step S305. In step S306, color correction conditions are selected based on the ink discharge amount acquired in step S305. Then, in step S307, printing is performed under the color correction conditions selected in step S306. Such a procedure enables the execution of simple and high-precision color correction.

The details of each processing will be described below. In step S301, the paper type for use in printing a test chart is selected. The selection of the paper type is made by a user via the keyboard 107 or the like. Then, in step S302, a chart is printed based on the paper type selected in step S301. As for chart layout information and printing gradations, printing is performed based on the information stored in the storage unit 105. Another system configuration is also conceivable, in which a program for creating a chart is prepared and a chart is created according to information such as image forming conditions. Since the size of image information is generally large, it is better to create a chart according to such a program in order to reduce the amount of information. The effect of the present embodiment can also be achieved with any such apparatus that prints a chart in single color ink with a predetermined gradation, and it is apparent that the embodiments according to the present invention are affected by neither the chart layout nor the method for creating a chart.

Figure 4:
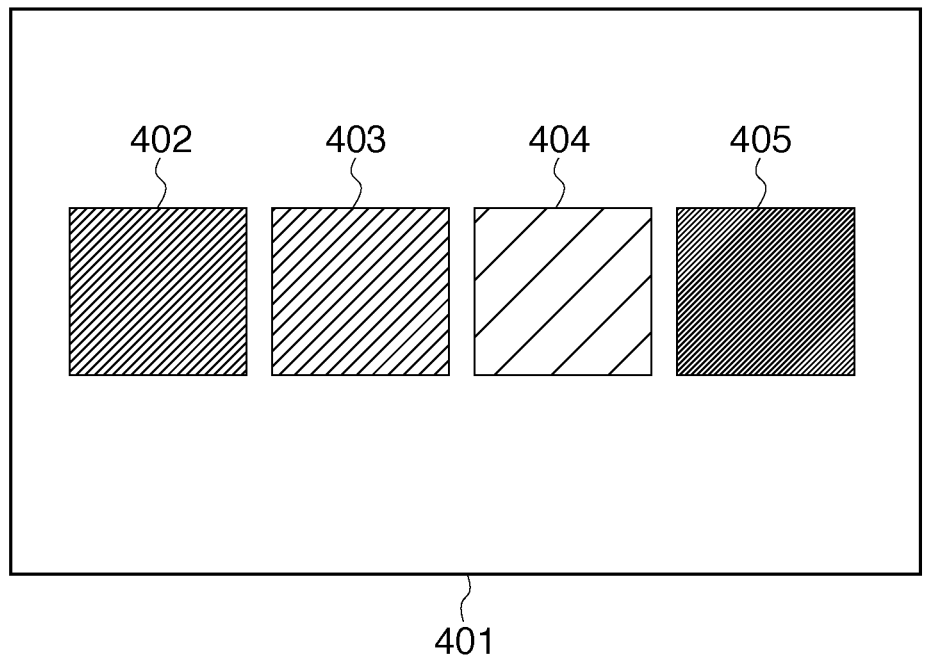
FIG. 4 is a diagram illustrating an example of a chart used in an embodiment of the present invention.

FIG. 4 is a diagram illustrating an example of a chart used in the present embodiment. Note that, in the present embodiment, a single sheet of paper on which a measuring area to be measured is arranged in multiple locations is referred to as a chart. In the present embodiment, a measuring area to be measured is also referred to as a "patch" (hereinafter, data that represents a patch is also referred to as "patch data"). Paper 401 is printing paper on which patches are printed (each ink is daubed all over in each patch area), with a patch 402 being printed in only cyan ink, a patch 403 being printed in only magenta ink, a patch 404 being printed in only yellow ink, and a patch 405 being printed in only black ink. While the present embodiment describes the case where patches are arranged perpendicular to the direction along the length of paper as illustrated, the prime purpose of the embodiments according to the present invention is to acquire a colorimetric value for each ink color. It is thus apparent that the effect of the present embodiment can also be achieved with a chart that has a different patch arrangement from that of the present embodiment, and that the effect of the present embodiment is not affected by the patch arrangement.

In step S303, colorimetry is performed on the chart printed in step S302. The colorimetry on the chart is performed with an ordinary spectrocolorimeter. In the present embodiment, while measurement is performed using a spectrocolorimeter for colorimetry, it is apparent that the present embodiment is not affected by the type of such measurement equipment. For example, measurement may be performed with a scanner and any other colorimeter using an RGB sensor, it thus being apparent that the effects of the present embodiment can also be achieved with the use of any colorimeter.

In general, colorimetric data obtained by a colorimeter includes hue, brightness, color saturation, and so on that have been converted to numerical form in a variety of color systems (e.g., XYZ colorimetric system (CIE 1931 colorimetric system), L*a*b* colorimetric system (CIE 1976), etc.). The present embodiment describes a case of using the commonly used L*a*b* colorimetric system. Note that the XYZ colorimetric system (CIE 1931 colorimetric system) can be converted into another colorimetric system (e.g., the L*a*b* colorimetric system). Thus, the XYZ colorimetric system may be stored as reference data and used for conversion into another colorimetric system that corresponds to colorimetric data at the time of comparison with the colorimetric data. This makes it possible to prevent an increase in the amount of data stored. It is apparent that the effect of the present embodiment can also be achieved with the use of any other colorimetric system that defines density or color space.

In the present embodiment, in step S304, a head discharge amount rank is estimated as ink discharge amount information, based on the colorimetric value obtained in step S303. An algorithm for estimating the ink discharge amount is described below in detail.

Figure 5:
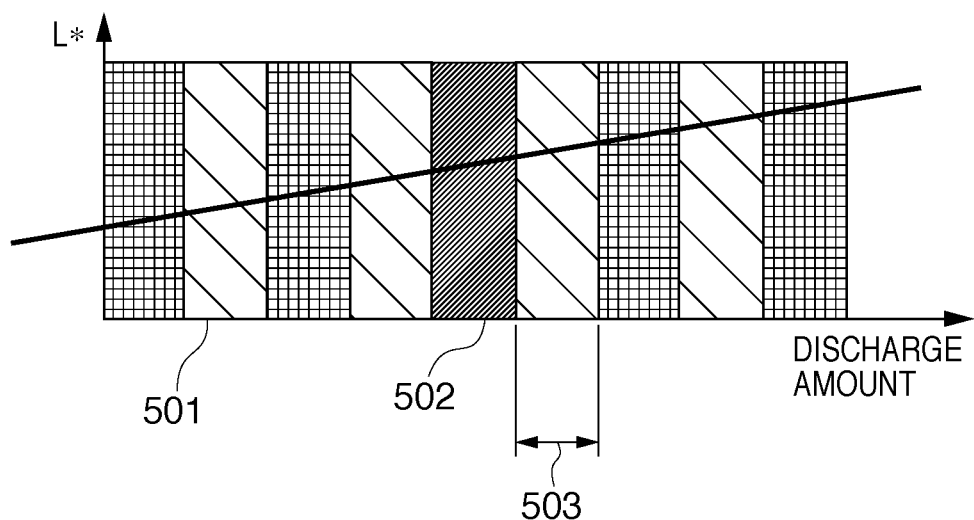
FIG. 5 is a diagram showing a relationship between the head discharge amount and the colorimetric value.

FIG. 5 is a diagram showing a relationship between the head discharge amount and the colorimetric value. Reference numeral 501 is a graph showing the correspondence between the head discharge amount and the brightness value (colorimetric value) $L^*$, with the horizontal axis representing the head discharge amount and the vertical axis representing the brightness value $L^*$. If such a correspondence is prepared in advance, the head discharge amount can be estimated from the colorimetric value. Moreover, since color development characteristics vary depending on the paper type, if the correspondence between the head discharge amount and the colorimetric value is held for each paper type, the head discharge amounts for various paper types can be estimated by selecting the correspondence according to the paper-type information acquired in step S301.

The head discharge amount estimated as described is held as a head discharge amount rank that is discrete information. The head discharge amount rank has the value of 0 as the center and is incremented by one if the discharge amount is increased by a certain amount. Reference numeral 502 in FIG. 5 represents the center value for the head discharge amount, and reference numeral 503 represents an increment per rank in the discharge amount.

In order to reduce the amount of information, the present embodiment is described assuming that the center value for the discharge amount is 5 ng and the increment per rank is 0.2 ng. Performing such estimation of the head discharge amount for each ink type enables color correction to be performed for each ink type. It is apparent that the effect of the present embodiment can also be achieved in the case where the center value for the head discharge amount is different or an increment per rank is different. For example, in the case where higher precision color correction is required, the increment may be further reduced to 0.1 ng, for example, in order to implement color correction with higher precision.

Next, the head discharge amount is estimated in user environments according to the prepared information that shows the correspondence between the head discharge amount and the colorimetric value. The following is a description of a technique that enables simple and high-precision estimation of the head discharge amount by estimating the head discharge amount based on the colorimetric value.

Figures 6, 7:
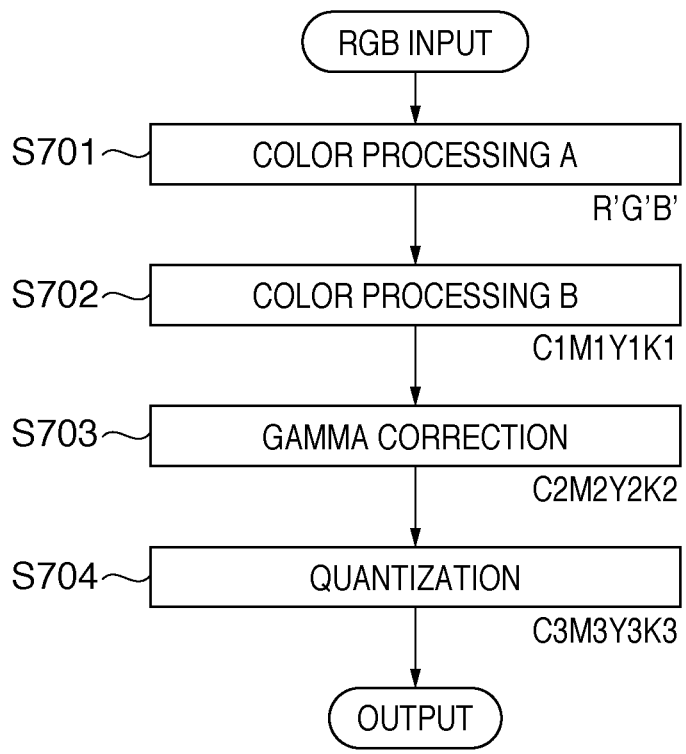
FIG. 6 is a diagram showing a head discharge amount rank estimation table according to an embodiment of the present invention.
FIG. 7 is a flow chart showing a procedure for image processing performed by an ordinary printer.

FIG. 6 is a diagram showing a head discharge amount rank estimation table for a C ink. The head discharge amount is estimated using the head discharge amount rank estimation table. The head discharge amount rank estimation table is a table that shows a list of correspondences between the head discharge amount rank and the colorimetric value, with such a head discharge amount rank estimation table being held for each ink type. The head discharge amount rank estimation table can be created by preparing multiple heads whose discharge amounts are known in advance, performing printing and colorimetry under the same conditions as the image forming conditions for printing a test chart, and acquiring colorimetric values.

Now, a method for measuring the head discharge amount will be described. Conceivable examples of the method for measuring the head discharge amount include a method for performing actual printing and measuring the number of dots printed and the amount of ink used, and a method for measuring the sizes of dots printed on paper. Note that the prime and intended purpose of the present embodiment is to establish the correspondence between the head discharge amount and the colorimetric value, and therefore, any technique may be used as the method for measuring the amounts of discharge from previously prepared multiple heads.

Also, since different colorimetric values are obtained for each ink type, if the head discharge amount rank estimation table is held for each ink type, the discharge amounts for all available ink types can be estimated. Also in the present embodiment, the correspondence between the head discharge amount rank and the colorimetric value is held for each paper type because color development characteristics vary from paper to paper. The left column in FIG. 6 shows the head discharge amount rank, the middle column shows the brightness value $L^*$ (colorimetric value) for glossy paper, and the right column shows the brightness value $L^*$ (colorimetric value) for art paper. By holding the correspondence between the head discharge amount rank and the colorimetric value for each paper type in this way, it is possible to estimate the head discharge amounts for various paper types.

The estimated head discharge amount information is stored in the storage unit 105 or the like in the information processing apparatus. In the present embodiment, while the head discharge amount information is stored in the storage unit 105 of the information processing apparatus, it may be stored in a PC register or the like, and it is apparent that the effect of the present invention can also be achieved irrespective of how the information on printing characteristics is held.

Then, the discharge amount information estimated in step S304 for management is acquired in step S305. In step S306, an appropriate color correction condition is selected from among predetermined multiple color correction conditions, based on the estimated discharge amount value obtained in step S305. Finally, in step S307, printing is executed with regard to the actual image data to be printed based on the correction condition selected in step S306.

Now, the color correction conditions for performing color correction will be described. FIG. 7 is a flow chart showing a procedure for image processing performed by an ordinary printer (image forming apparatus). In step S701, original image signals R, G, and B are converted into image signals R', G', and B' that are capable of adapting to a range of color reproduction performed by a printing device (color processing A). For example, original RGB image signals that have been obtained with image input equipment, such as a digital camera or a scanner, or that have been obtained through computer processing are converted into R'G'B' signals through the color processing A. The R'G'B' signals are then converted into signals that correspond to color inks in step S702 (color processing B). In the present embodiment, since the image forming apparatus has a four-color ink configuration, the R'G'B' signals are converted into density signals C1, M1, Y1, and K1 that correspond to cyan, magenta, yellow, and black, respectively.

Note that specific color processing B is generally such that a three-dimensional look-up table (3D LUT) of RGB inputs and CMYK outputs is used, and for an input value that deviates from a lattice point, an output value is obtained by interpolation of output values for the surrounding lattice points. Then, in step S703, the densities of the density signals C1, M1, Y1, and K1 are corrected by gamma correction using a correction table so as to obtain gamma-corrected density signals C2, M2, Y2, and K2. Then, in step S704, the gamma-corrected density signals C2, M2, Y2, and K2 are converted by quantization in binary form into image signals C3, M3, Y3, and K3 that are transferred to a head. Note that error diffusion or dithering, for example, is used as a quantization (binarization) technique. Dithering is a technique for performing binarization using a predetermined dithering pattern that has a different threshold value for the density signal of each pixel.

In the present embodiment, multiple gamma correction curves that correspond to the head discharge amount ranks are created in advance at the time of performing gamma correction processing in step S703, then a correction curve is selected from among the multiple curves, and color correction processing is performed using the selected correction curve. Note that the description of the present embodiment is given assuming that a gamma correction curve for use in color correction is referred to as a "color-correction gamma curve."

Figure 8:
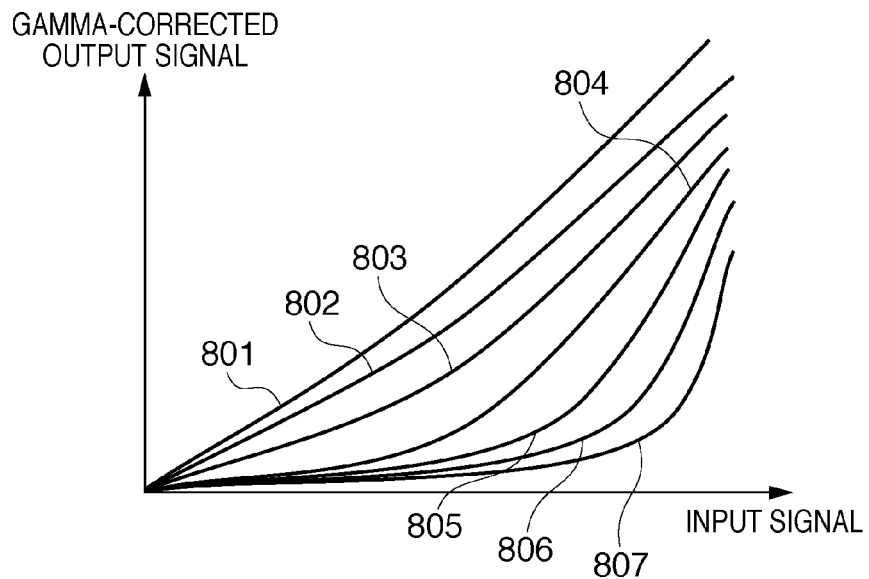
FIG. 8 is a graph showing gamma correction curves corresponding to discharge amount ranks in the case where a C ink is used for glossy paper.

FIG. 8 is a graph showing gamma correction curves that correspond to the discharge amount ranks, in the case where a C ink is used for glossy paper. The horizontal axis represents the input signal value that is a signal value converted in step S702, and the vertical axis represents the output signal value obtained by the gamma correction. In FIG. 8, reference numerals 801 to 807 represent color-correction gamma curves, the curve 801 corresponding to rank −3, the curve 802 corresponding to rank −2, the curve 803 corresponding to rank −1, the curve 804 corresponding to rank 0, the curve 805 corresponding to rank +1, the curve 806 corresponding to rank +2, and the curve 807 corresponding to rank +3. Such color-correction gamma curves corresponding to the ranks are created and held in advance for each ink type and for each available paper type. The color-correction gamma curves shown in FIG. 8 represent correction values across the range of gradations that can be represented by the printer.

By previously creating and holding the color-correction gamma curves that correspond to the head discharge amount ranks in this way, color correction can be performed without measuring patches with all gradations. With the conventional techniques such as adjusting colors to standard colors, it is difficult to perform simple color correction because colorimetry is required for all gradations.

It is also possible to reduce error factors involved in estimation by increasing the number of patches to be measured. A detailed example that uses multiple patches will be described later in the second embodiment.

Moreover, in actual printing, selecting a color-correction gamma curve that corresponds to the discharge amount rank value estimated in step S304 for each of the held paper types and for each of the held ink types enables the implementation of color reproduction where the head discharge amount has been corrected. Note that the head discharge amount is the same even if the paper type is different, in the case where the head discharge amount rank has been estimated for glossy paper. For this reason, the same head discharge amount rank estimated for glossy paper can also be used in the case of printing on art paper. By managing the head discharge amount as a printing characteristic in this way, color correction can be performed using the head discharge amount rank information obtained for a certain paper type, and using a color-correction gamma curve that has been selected for all other available paper types.

The present embodiment has described the case where the discharge amount estimation table that shows the correspondence between the amount of discharge from a head and the colorimetric value is used as a method for estimating information on the ink discharge amount. For improved precision of correction, information needs to be held with smaller increments in the discharge amount. In order to prevent an increase in the amount of information at that time, it may for example be possible to hold an approximate equation that is obtained by a first-order approximation of the correspondence between the head discharge amount and the colorimetric value. If the first-order approximation is insufficient, a higher-order approximate equation may be used. Examples of a high-precision approximate equation include approximation methods such as spline or Lagrangian methods, but the description of such high-precision approximation methods is omitted here since they are described in various documents and the description thereof is not the intention of the present embodiment. By holding such an approximate equation in this way, it is possible to configure a color correction processing system that saves storage memory. A technique that involves using a gradation area in which the correspondence between the head discharge amount and the colorimetric value changes linearly with changes in the number of dots to be printed is also conceivable. The use of such a technique enables the estimation of the head discharge amount to be performed with high precision, using a simpler approximate equation.

In the present embodiment, the description has been given using L*a*b* values obtained with a spectrocolorimeter. It is, however, apparent that the effect of the present embodiment can also be achieved with the use of the XYZ color space in the other colorimetric system, density values, RGB data received from a scanner, or the like; that is, the present embodiment is not limited to colorimetry in the L*a*b* color space using a spectrocolorimeter.

In the present embodiment, while the detailed description of the number of dots forming a patch is omitted, another configuration is also conceivable in which a mechanism for controlling the number of dots is additionally provided so that the number of dots can be controlled for each ink type and for each paper type, depending on which a chart is printed. In such a configuration, a patch with a more appropriate gradation can be used for each ink type and for each paper type for the estimation of the head discharge amount, which further improves the precision of color correction. Note that, in the present embodiment, the printing of a test pattern is selected by a user. However, if an image forming apparatus employed has the function of automatically determining the paper type, the selection of the paper type may be made based on the determination result.

Second Embodiment

Next, another embodiment is described in which colorimetry is performed on multiple patches so as to enable the estimation of the head discharge amount to be performed with higher precision and with reduced influence of trial differences. Note that, in order to simplify the description, the present embodiment describes a case where two patches are printed in the same ink. It is, however, apparent that the present embodiment is not limited to such a case where the number of patches is two for the same ink, and the effect of the present embodiment can also be achieved in an example where a larger number of patches are printed. To further simplify the description, the processing that has been described in detail in the first embodiment will not be described here.

Figure 9:
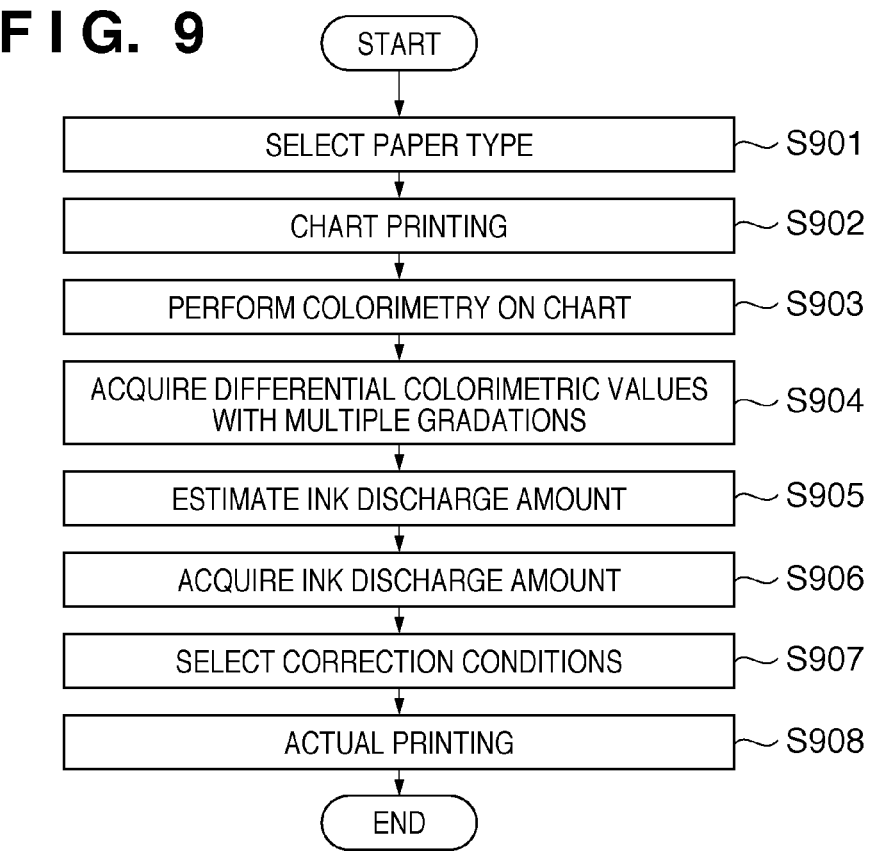
FIG. 9 is a flow chart showing a procedure for color correction processing according to a second embodiment.

A configuration example of an image forming apparatus according to the present embodiment is identical to the configuration described in the first embodiment, so the detailed description thereof is omitted here. FIG. 9 is a flow chart showing a procedure for color correction processing according to the present embodiment. In the present embodiment, printing and colorimetry are performed on multiple patches for each ink type so as to estimate the head discharge amount.

In step S901, the paper type for use in printing a test chart is selected. The details thereof are identical to those in step S301 and thus not described herein. In step S902, patches with multiple gradations are printed for each ink type.

Figure 10:
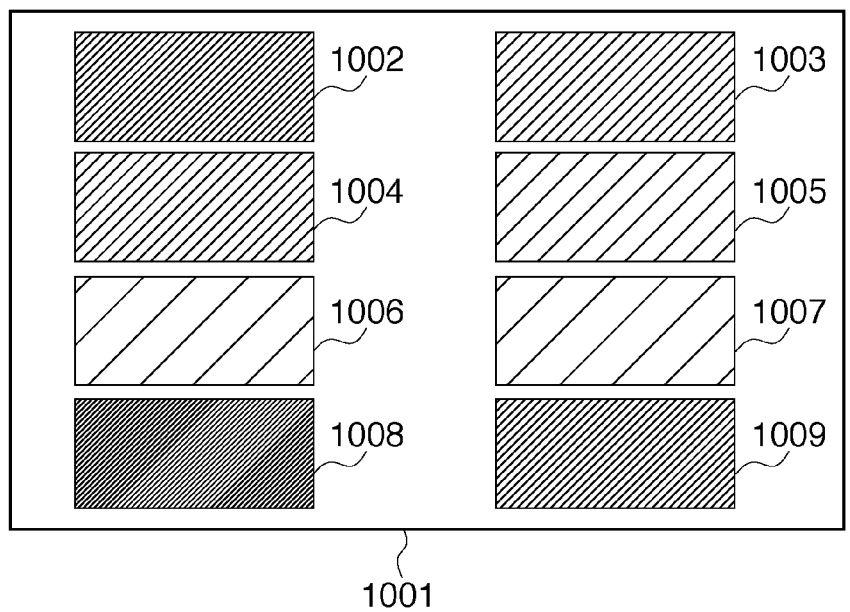
FIG. 10 is a diagram illustrating an example of a chart according to an embodiment of the present invention.

FIG. 10 is a diagram showing an example of a chart according to the present embodiment. Paper 1001 is a sheet of paper with multiple patches printed thereon (each ink is daubed all over in each patch area). Patches 1002 and 1003 are printed in only C ink. Patches 1004 and 1005 are printed in only M ink. Patches 1006 and 1007 are printed in only Y ink. Patches 1008 and 1009 are printed in only K ink. Two patches are printed for each ink, and the present embodiment describes an example where two patches are formed under conditions of different numbers of dots. The present embodiment describes a case where, out of the patches for each ink, the left-side patch includes a larger number of dots than the right-side patch, the left-side patch being referred to as a "patch 1," the right-side patch being referred to as a "patch 2". It is, however, apparent that the present embodiment is not affected by the patch arrangement because the feature of the present embodiment is to estimate the head discharge amount based on the colorimetric value for each ink and perform correction.

In step S903, colorimetry is performed on multiple patches that are included in the chart printed in step S902. The details thereof are not described here because they are identical to those described in the first embodiment. Then, in step S904, a difference between the colorimetric values for the patches 1 and 2 is calculated for each ink type, based on the colorimetric values that have been obtained for the patches 1 and 2 in step S903. Then, in step S905, a discharge amount rank is estimated based on the difference in the colorimetric value that has been calculated in step S904. Now, a method for estimating a discharge amount rank, using multiple patches with different gradations will be described in detail.

Figure 11:
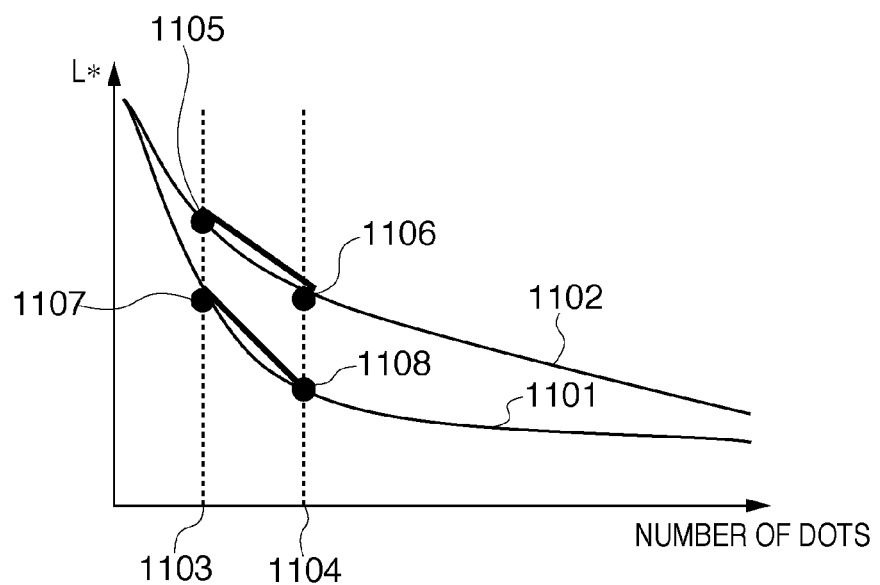
FIG. 11 is a graph plotting changes in L* with respect to the number of dots for the C ink.

FIG. 11 is a graph showing a change in $L^*$ with respect to the number of dots for the C ink for each of the different head discharge amount ranks. The horizontal axis represents the number of dots forming a patch, and the vertical axis shows the brightness value $L^*$ (colorimetric value). In FIG. 11, a curve 1101 represents a change for a head having a large discharge amount (i.e., a head with a high discharge amount rank) and a curve 1102 represents a change for a head having a small discharge amount (i.e., a head with a low discharge amount rank). Reference numeral 1103 indicates the number of dots corresponding to the patch 2, reference numeral 1104 indicates the number of dots corresponding to the patch 1, and reference numerals 1105, 1106, 1107, and 1108 indicate colorimetric values in those cases for the respective heads.

It is a well-known fact that, in inkjet printers, the brightness value does not change in a straight line with respect to the ink discharge amount on paper. This is because, in an inkjet printer that forms an image by discharging dots on paper, if the amount of ink on paper exceeds a predetermined amount, dots are printed overlapping one another on paper. If this state is expressed as the paper being filled with dots, discharged dots greatly affect the area of paper to be covered before the paper is filled with dots, so a change in the number of dots greatly affects the color. However, once the paper has been filled with dots, additional discharge of ink on paper gives no change in the area of paper that has already been covered with dots, thus having little effect on the color.

Figures 12, 13:
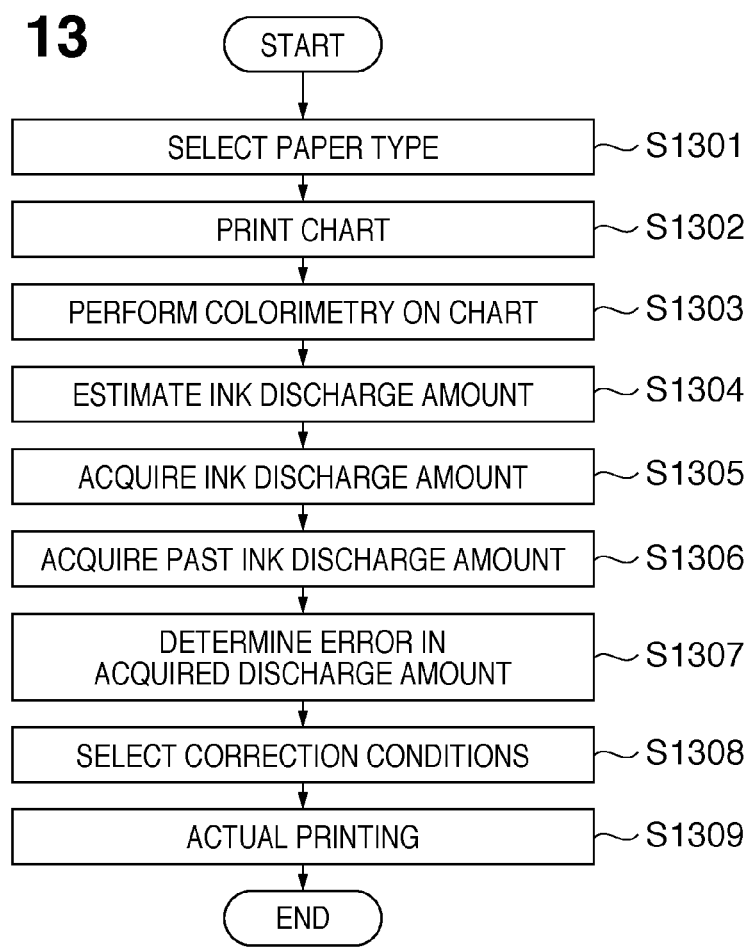
FIG. 12 is a diagram showing a head discharge amount rank estimation table according to an embodiment of the present invention.
FIG. 13 is a flow chart showing a procedure for color correction processing according to a third embodiment.

Accordingly, plotting the number of dots and the brightness $L^*$ shows that, in the case of a small number of dots, color shows an abrupt change with the number of dots, and in the case of a large number of dots, color shows a gradual change. Moreover, if the size per dot varies, an area where the number of dots and color show a gradual change will be in a different location because the number of dots that can fill in the paper varies. Specifically, if a comparison is made between a head having a large dot size and a head having a small dot size, the head with a large dot size requires a smaller number of dots in order to fill in the paper; therefore, if colorimetry is performed on patches having different numbers of dots, resultant color changes will vary. Accordingly, the discharge amount rank can be estimated by checking a difference between the chromatic values 1105 and 1106 with respect to a change in the number of dots and a difference between the chromatic values 1107 and 1108 with respect to a change in the number of dots. FIG. 12 is a diagram showing a head discharge amount rank estimation table according to the present embodiment.

Then, information on the discharge amount rank corresponding to each ink type, which has been calculated in step S905, is acquired in step S906. Then, in step S907, a gamma correction curve is selected according to the information on the discharge amount rank acquired in step S906. Then, in step S908, actual printing is performed in which correction is performed using the gamma correction curve selected in step S907. Steps S906 to S908 are identical to steps S305 to S307 in the first embodiment.

As described above, the influence of error factors such as individual differences among colorimeters can be reduced by performing colorimetry on multiple patches of different numbers of dots and estimating a head discharge amount rank based on a difference between the colorimetric values for the patches. This consequently enables high-precision estimation of the head discharge amount rank, thus enabling color correction to be performed with higher precision.

The present embodiment has described a difference between colorimetric values in the case where patches are formed of different numbers of dots. Here, it is also possible to reduce an error in the estimated discharge amount rank by additionally providing the function of estimating a discharge amount rank for each patch with the use of the same technique as described in the first embodiment and then performing averaging processing.

For example, in step S903, as in the first embodiment, a head discharge amount rank is estimated for each patch, based on the colorimetric value for each patch obtained through colorimetry. Then, the estimated head discharge amount ranks for multiple patches are integrated depending on the ink type. Specifically, an average value is calculated from the estimated discharge amount rank obtained from the patch 1 printed in C ink and the estimated discharge amount rank obtained from the patch 2. The average value obtained is then subjected to integer processing and the resultant value is determined as an estimated head discharge amount rank for the C ink.

By performing such processing on the other inks including M, Y, and K inks, a head discharge amount rank for each ink type is estimated. As described, the head discharge amount rank estimation table described in the first embodiment (FIG. 6) is provided to hold the correspondence between the head discharge amount and the colorimetric value for each paper type, for each ink type, and for each gradation with which printing is performed. As a result, it is possible by using the estimation result for the discharge amount obtained from multiple patches for each ink type to estimate the head discharge amount rank while reducing the effect of trial differences during printing of a test chart or while reducing the effect of trial differences during colorimetry on patches. This accordingly improves the precision of color correction. While the present embodiment has described the case where patches have different gradations, the effect of trial differences can also be reduced simply with such a method for estimating a discharge amount rank by performing printing and colorimetry on the same patch multiple times.

Third Embodiment

Next, error processing that is performed on the calculated head discharge amount rank is described. Note that the present embodiment describes the processing performed in the case where the obtained discharge amount rank value is invalid, so the same description as that in the first and second embodiments will be omitted herein.

As described in the first and second embodiments, printing of a chart and colorimetry need to be performed at the time of estimating a discharge amount rank. However, in some cases, a proper colorimetric value may not be obtained at the time of measurement due to scratches on a sample or the like. It is thus desirable to perform color correction processing after checking for the validity of the obtained discharge amount rank. Now, a process for checking the obtained discharge amount rank will be described below.

FIG. 13 is a flow chart showing a procedure for color correction processing according to the present embodiment. The processing of steps S1301 to S1305 is identical to that in the first embodiment, so the detailed description thereof will be omitted. In step S1306, an estimated discharge amount rank value that has been obtained in the past is acquired. Then, a difference value between the discharge amount rank value estimated in step S1305 and the past discharge amount rank value obtained in step S1306 is calculated in step S1307. If the calculated difference value is a predetermined reference value or higher, it is determined that the estimation of the discharge amount rank may possibly have failed and an error message (warning) is displayed.

Then, in step S1308, if the estimated discharge amount rank value has been determined to be valid in step S1307, the process proceeds to step S1309 where color correction processing is performed. On the other hand, if the estimated discharge amount rank value has been determined to be invalid in step S1307, color correction is performed by either using the past information or by first displaying a warning to a user and then using the estimated discharge amount rank value.

By adding the process for checking the estimated discharge amount rank value as described above, the validity of a user operation can be confirmed. This consequently prevents correction from being performed based on erroneous information, thus enabling the implementation of a color correction method that provides higher user convenience. Note that the other conceivable examples of such an error determination technique include a method for placing upper and lower limits on the estimated discharge amount rank value, and a method for determining an error based on the acquired colorimetric value. It is apparent that the effect of the present invention may also be achieved with any other error determination technique.

Other Embodiment

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-031967, filed Feb. 13, 2009, which is hereby incorporated by reference herein in its entirety.

What is claimed is:

1. An image processing method for printing by a print head which discharges an ink droplet, the method comprising the steps of:

acquiring amount information on an amount of ink droplet discharged by the print head, based on a measurement value by measuring a test pattern printed by the print head and information corresponding to a print medium on which the test pattern is printed among a plurality of kinds of information corresponding to a plurality of kinds of print media, wherein each of the plurality of kinds of information associates the amount information with a predetermined measurement value; and determining a correction table corresponding to a print medium on which an image is to be printed, based on the acquired amount information.

2. The method according to claim 1, wherein ink droplet absorption characteristics of the plurality of kinds of print media differ from each other.

3. The method according to claim 1, wherein predetermined measurement values of the plurality of kinds of print media differ from each other, wherein each of the predetermined measurement values is a color-measured value by discharging a predetermined amount of ink into a unit area of an image in each of the plurality of kinds of print media.

4. The method according to claim 1, wherein the print head is able to discharge ink droplets corresponding to a plurality of ink colors, wherein the measurement value corresponds to each of the plurality of ink colors, wherein the correction table is determined on each of the plurality of ink colors, and wherein print data includes a plurality of pieces of data, corrected by the correction table, corresponding to the plurality of ink colors.

5. The method according to claim 1, further comprising a step of printing the test pattern on the printing medium by the print head.

6. The method according to claim 1, further comprising a step of measuring the test pattern by using a measurement unit and acquiring the measurement value.

7. The method according to claim 6, wherein the measurement unit is a spectro-colorimeter.

8. The method according to claim 1, wherein the test pattern includes a plurality of patches which correspond to a plurality of printing densities, and the correction table is a 1D-LUT for correcting density of the print data.

9. The method according to claim 1, further comprising a step of determining whether or not the amount of the ink droplet is adequate, in the case where it is determined that the amount of the ink droplet is adequate, the correction table is determined based on the amount information on the amount of the ink droplet, in the case where it is determined that the amount of the ink droplet is not adequate, the correction table is determined based on the amount information on an amount of the ink droplet which had been previously acquired.

10. The method according to claim 1, wherein the plurality of kinds of print media include a first print medium and a second print medium, and wherein the correction table corresponding to the first print medium is determined in a case where an image is to be printed on the first print medium, and the correction table corresponding to the second medium different from the first print medium is determined in a case where the image is to be printed on the second medium.

11. The method according to claim 1, further comprising a step of correcting image data of the image by using the determined correction table.

12. The method according to claim 1, wherein the measurement value is a L* value of a CIE-L*a*b* color coordinate system.

13. The method according to claim 1, wherein the plurality of kinds of print media includes a glossy paper and an art paper.

14. An image processing apparatus for printing by a print head which discharges an ink droplet, the apparatus comprising:

a storage unit configured to store a plurality of kinds of information, wherein the plurality of kinds of information correspond to a plurality of types of printing media, and wherein each of the plurality of kinds of information associates amount information on an amount of ink droplet discharged by the print head with a predetermined measurement value by measuring a test pattern printed by the print head;

a acquisition unit configured to acquire amount information on an amount of ink droplet discharged by the print head, based on a measurement value by measuring a test pattern printed by the print head and information corresponding to a print medium on which the test pattern is printed among a plurality of kinds of information corresponding to a plurality of kinds of print media, wherein each of the plurality of kinds of information associates the amount information with the predetermined measurement value; and a determination unit configured to determine a correction table corresponding to a print medium on which an image is to be printed, based on the acquired amount information.

15. The apparatus according to claim 14, wherein the print head is able to discharge ink droplets corresponding to a plurality of ink colors, wherein the measurement value corresponds to each of the plurality of ink colors, wherein the determination unit determines the correction table on each of the plurality of ink colors, wherein print data includes a plurality of pieces of data, corrected by the correction table, corresponding to the plurality of ink colors.

16. The apparatus according to claim 14, further comprising a measuring unit configured to measure the test pattern and acquire the measurement value.

17. The apparatus according to claim 14, wherein ink droplet absorption characteristics of the plurality of kinds of print media differ from each other.

18. The apparatus according to claim 14, wherein redetermined measurement values of the plurality of kinds of print media differ from each other, wherein each of the predetermined measurement values is a color-measured value by discharging a predetermined amount of ink into a unit area of an image in each of the plurality of kinds of print media.

19. The apparatus according to claim 14, wherein the test pattern includes a plurality of patches which correspond to a plurality of printing densities, and the correction table is a 1D-LUT for correcting density of the print data.

20. The apparatus according to claim 14, wherein the determining unit further determines whether or not an amount of the ink droplet is adequate, in the case where it is determined that the amount of the ink droplet is adequate, the correction table is determined based on the amount information on the amount of the ink droplet, in the case where it is determined that the amount of the ink droplet is not adequate, the correction table is determined based on the amount information on an amount of the ink droplet which had been previously acquired.

21. The apparatus according to claim 14, wherein the plurality of kinds of print media include a first print medium and a second print medium, and wherein the correction table corresponding to the first print medium is determined in a case where an image is to be printed on the first print medium, and the correction table corresponding to the second medium different from the first print medium is determined in a case where the image is to be printed on the second medium.

22. A computer-readable storage medium storing a program which causes a computer to execute an image processing method for printing by a print head which discharges an ink droplet, the method comprising the steps of:

acquiring amount information on an amount of ink droplet discharged by the print head, based on a measurement value by measuring a test pattern printed by the print head and information corresponding to a print medium on which the test pattern is printed among a plurality of kinds of information corresponding to a plurality of kinds of print media, wherein each of the plurality of kinds of information associates the amount information with a predetermined measurement value; and determining a correction table corresponding to a print medium on which an image is to be printed, based on the acquired amount information.

* * * * *